United States Patent

Stark et al.

[11] Patent Number: 5,890,292
[45] Date of Patent: Apr. 6, 1999

[54] PORTABLE HAND-GUIDED WORK APPARATUS HAVING A TOOL GUARD

[75] Inventors: Thomas Stark, Waiblingen; Joachim Hoffmann, Plochingen; Volker Kalbfleisch, Baltmannsweiler, all of Germany

[73] Assignee: Andreas Stihl, Waiblingen, Germany

[21] Appl. No.: 890,934

[22] Filed: Jul. 10, 1997

[30] Foreign Application Priority Data

Jul. 25, 1996 [DE] Germany .................. 196 30 022.3

[51] Int. Cl.[6] .............. B23D 45/16; B27B 9/00; B27G 19/04
[52] U.S. Cl. .................. 30/124; 30/391; 83/98; 83/478
[58] Field of Search .............. 30/124, 388, 389, 30/390, 391; 83/100, 478, 98

[56] References Cited

U.S. PATENT DOCUMENTS

| | | | |
|---|---|---|---|
| 3,882,598 | 5/1975 | Earle et al. | 30/390 |
| 3,965,787 | 6/1976 | Plischke | 83/478 |
| 5,046,255 | 9/1991 | Lebreux | 30/391 X |
| 5,084,972 | 2/1992 | Waugh | 30/124 |
| 5,167,215 | 12/1992 | Harding, Jr. | 30/124 X |
| 5,445,056 | 8/1995 | Folci | 30/124 X |
| 5,481,806 | 1/1996 | Pratt | 30/390 X |
| 5,531,147 | 7/1996 | Serban | 83/478 |
| 5,537,748 | 7/1996 | Takahashi et al. | 30/124 |
| 5,539,985 | 7/1996 | Wershe | 30/390 X |
| 5,579,584 | 12/1996 | Hoffman | 30/391 |

*Primary Examiner*—Eugenia A. Jones
*Attorney, Agent, or Firm*—Walter Ottesen

[57] ABSTRACT

A cutting machine having a rotatingly driven cutting tool (2) and a tool guard (1). The tool guard (1) has a first tool guard part (11) which is fixedly mounted with respect to the apparatus and a second tool guard part (12) which can be pivotably mounted relative to the first tool guard part (11). Each tool guard part includes side walls (30, 32) lying adjacent to respective sides of the cutting tool and a center web which connects the two side walls to each other. The center web (31) extends curved in the peripheral direction and is disposed above the cutting tool (2). In order to perform a disturbance-free pendular cut, the pivotable second tool guard part (12) carries a slide piece (40) which projects beyond the end edge (34) of the center web (31) and has a rounded outer slide surface (35) facing away from the center web (31). The end edge (34) faces away from the fixed first tool guard part (11).

16 Claims, 3 Drawing Sheets

Fig. 3
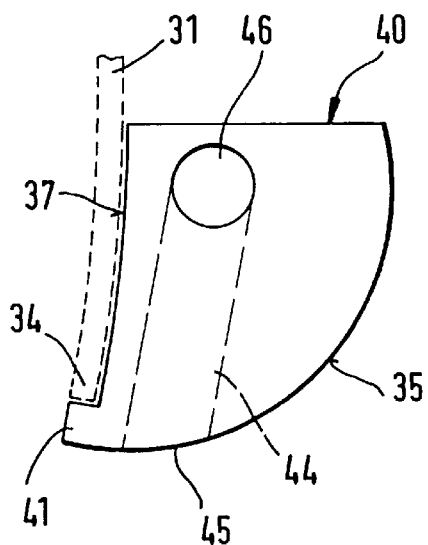
Fig. 4
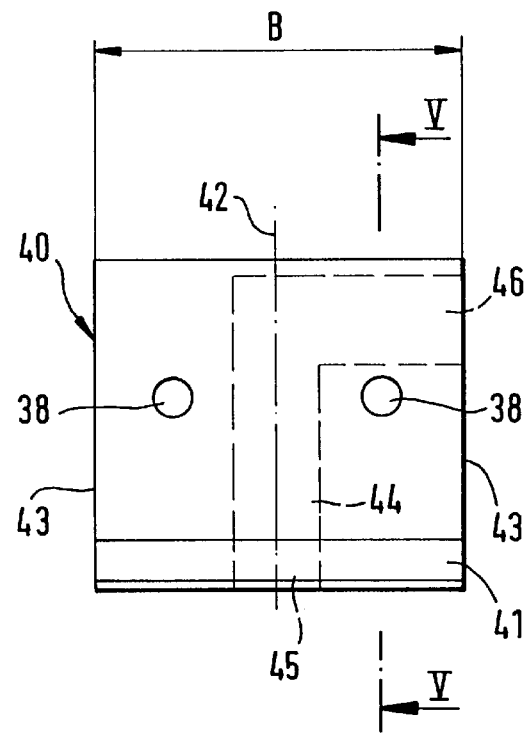
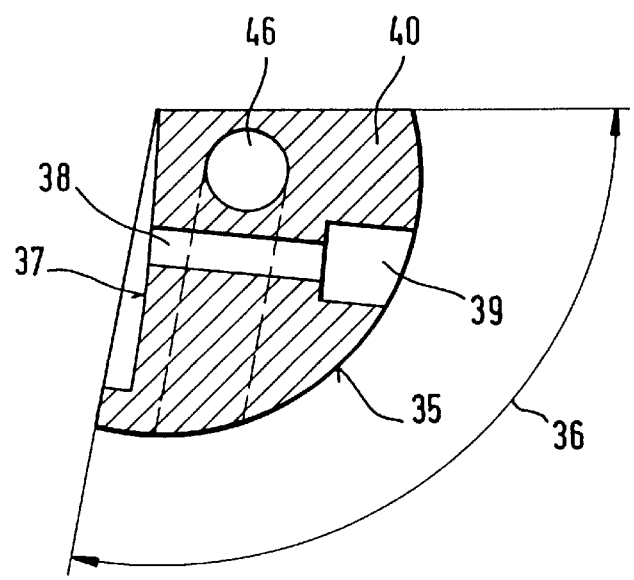
Fig. 5

5,890,292

PORTABLE HAND-GUIDED WORK APPARATUS HAVING A TOOL GUARD

FIELD OF THE INVENTION

The invention relates to a portable hand-guided work apparatus such as a cutting machine.

BACKGROUND OF THE INVENTION

In work apparatus of the kind mentioned above, such as cutting machines, a vacuum fan is mounted on the tool guard. The tool guard has a first tool guard part which is stationary and a second tool guard part which is pivotally mounted. The vacuum fan is mounted on the stationary tool guard part and is driven together with the cutting disc by a drive motor. The pivotable tool guard part has a center web having an end edge. This end edge rests upon the workpiece to be cut in order to ensure that the abrasion dust, which occurs during the cutting operation is taken up and vacuum removed as completely as possible.

When cutting in the forward direction, the forces acting on the end edge effect a pivoting of the second tool guard part into the stationary first tool guard part without significantly affecting the guidance of the work apparatus. When cutting in the opposite direction, the forces acting on the end edge of the center web lying on the workpiece cause the work apparatus to stand up whereby the guiding reliability is affected. This can lead even to lifting the cutting disk out of the kerf which, under some circumstances, can require the work apparatus to be positioned once again for cutting and this often leads to a ragged cut edge. For rough workpiece surfaces, problems in guiding the work apparatus therefore occur with a back and forth cutting movement (pendular cut).

SUMMARY OF THE INVENTION

It is an object of the invention to provide a work apparatus having a tool guard which is improved so that a reliable pendular cut can be carried out without the work apparatus being lifted relative to the workpiece being cut.

The portable hand-guided work apparatus of the invention is, for example, for a cutting machine and includes: a support; a rotatably driven cutting tool rotatably mounted on the support and having first and second sides; a tool guard surrounding the cutting tool over a peripheral angle; the tool guard having a first tool guard part fixedly mounted on the support and a second tool guard part mounted so as to be pivotable relative to the first tool guard part; each of the tool guard parts having two side walls disposed at respective sides of the cutting tool and a center web connecting the two side walls to each other; the center web being curved and extending peripherally above the cutting tool; the center web of the second tool guard part having an end edge facing away from the first tool guard part; a slide piece mounted on the second tool guard part at the end edge thereof; and, the slide piece having an outer rounded slide surface facing away from the end edge.

The slide piece is attached to the end edge lying on the workpiece. The arrangement of the slide piece having an external slide surface ensures that the tool guard and/or the pivotal tool guard part does not itself lie on the workpiece and become caught so that a trouble-free pendular cut is possible. The slide piece lies with its slide surface on the workpiece and ensures a substantially force-free sliding on the surface of the workpiece. An optimal position of the pivotal tool guard part is always provided independently of the angle at which the cutting machine is placed on the workpiece because of the rounded slide surface. This guarantees that the dust will be taken up.

Preferably, the slide piece projects beyond the end edge of the center web facing toward the workpiece so that, with certainty, the slide piece always comes to rest on the workpiece independently of the selected position of the cutting machine.

The slide piece advantageously has a blast channel which opens in the slide surface next to the end edge. The opening preferably lies adjacent to the end edge whereby the exiting blast flow is directed into the kerf tangentially to the cutting disc. The stream of dust and dirt is thereby blown from below and lifted. The stream cannot exit to the ambient via the kerf; instead, the stream is reliably directed into the tool guard so that a substantially complete removal of the occurring cutting dust is possible.

According to another embodiment of the invention, the blast flow directed to the blast channel is diverted from a suction fan which is mounted in the tool guard to vacuum away the abrasion dust. It can also be advantageous to divert the blast flow from a cooling fan cooling the drive motor.

BRIEF DESCRIPTION OF THE DRAWINGS

The invention will now be described with reference to the drawings wherein:

FIG. 3 is an enlarged detailed side elevation view of a slide piece;

FIG. 4 is an end view of the slide piece of FIG. 3; and,

FIG. 5 is a section view through the slide piece taken along line V—V of FIG. 4.

DESCRIPTION OF THE PREFERRED EMBODIMENTS OF THE INVENTION

Figure 1:
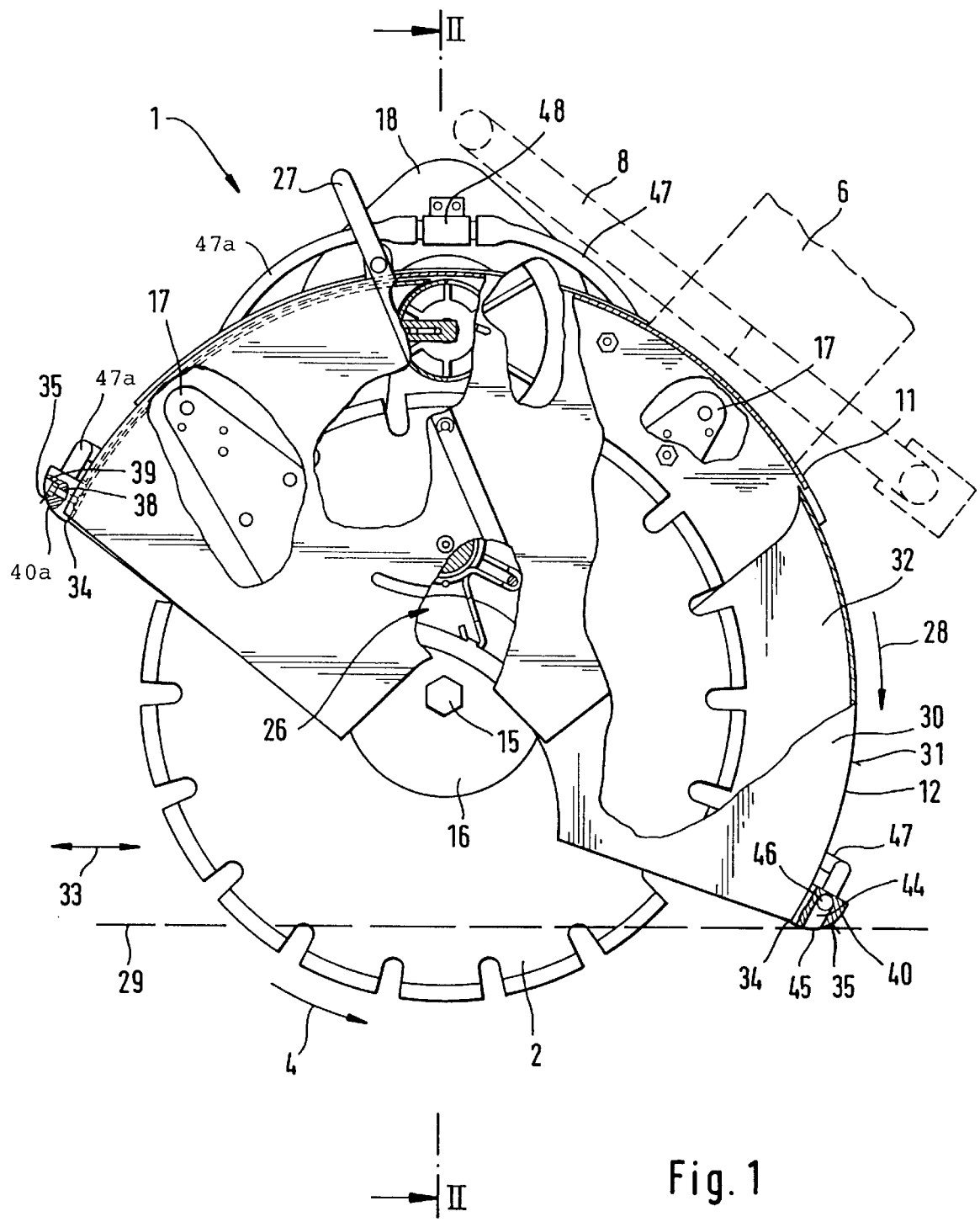
FIG. 1 is a side elevation view of a portion of a cutting machine equipped with a tool guard and a cutting disc rotatably mounted therein.
Figure 2:
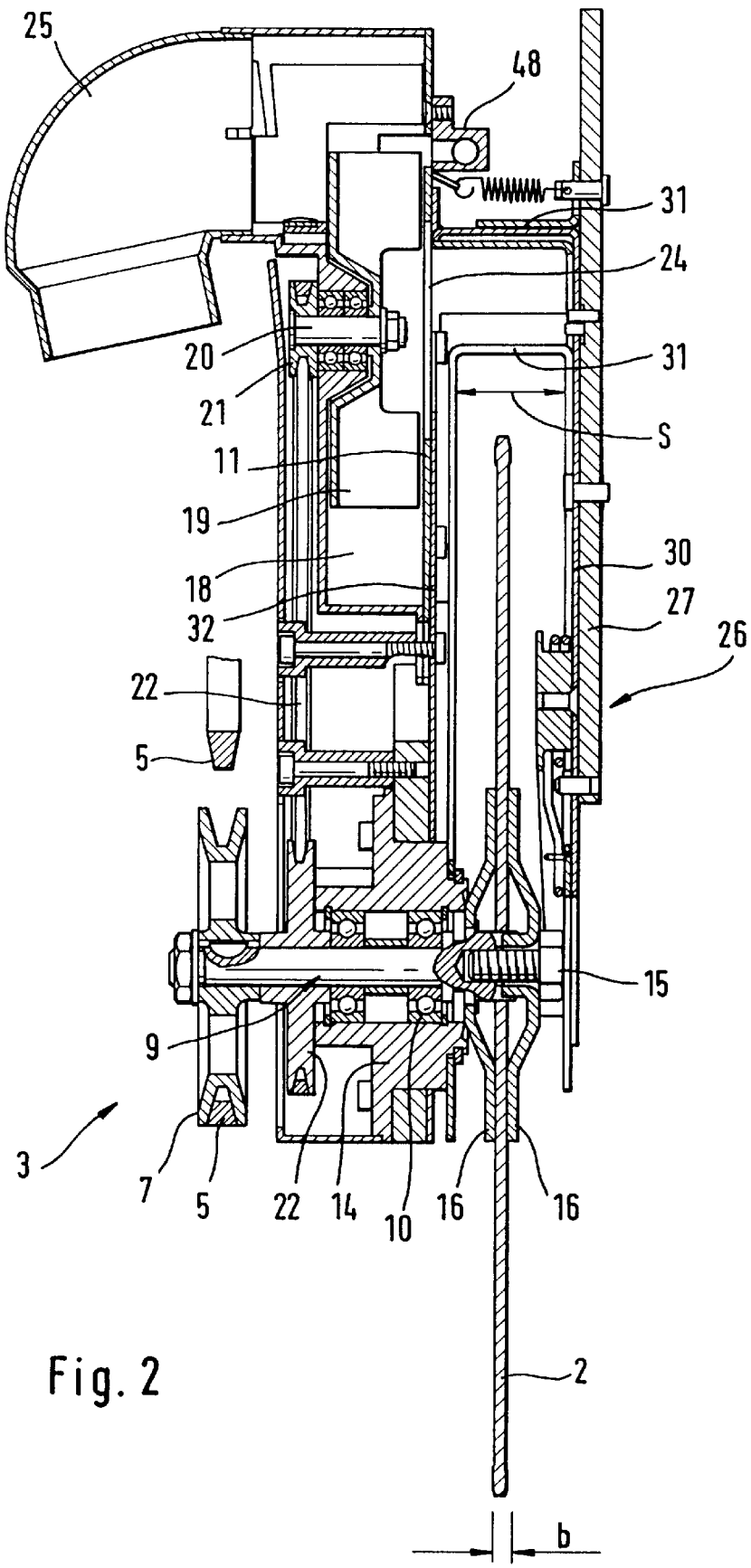
FIG. 2 is a section view along line II—II of FIG. 1 showing the tool guard with the cutting disc mounted therein.

The arrangement shown in FIGS. 1 and 2 includes a tool guard 1 and a cutting disc 2. This arrangement defines the head of a portable hand-guided work apparatus, namely, a cutting machine.

The cutting disc 2 is driven via a V-belt drive 3 in a rotational direction 4 by a drive motor (not shown). The V-belt 5 is arranged between the drive motor and a belt pulley 7 (see FIG. 2) and runs in a V-belt housing 6. The cutting machine is guided and held utilizing handle 8.

The belt pulley 7 is mounted on the one end of an output shaft 9 and is fixed thereon so that the output shaft rotates therewith. The output shaft 9 is held via a bearing 10 in a bearing housing 14. The output shaft 9 extends through the bearing housing 14 and carries the cutting disc 2 on the outwardly projecting end thereof. The cutting disc 2 is held between two clamping discs 16 which fix the cutting disc 2 via a clamping screw 15 so as to rotate with the output shaft 9.

The bearing housing 14 is fixedly mounted on the apparatus. Via two attachment flanges 17, the bearing housing 14 supports a first tool guard part 11 of the tool guard 1. This first guard part 11 is fixedly mounted to the apparatus. A fan housing 18 is formed between the attachment flanges 17 on the outer side facing toward the belt pulley 7. An impeller or fan wheel 19 is rotatably journalled in the fan housing 18. The fan shaft 20 carries a belt pulley 21 which is driven via a belt 22 from a belt pulley 23. The belt pulley 23 lies between the bearing 10 and the belt pulley 7 of the drive.

An intake opening 24 is provided for the fan wheel 19 in the first tool guard part 11 which is fixedly mounted to the apparatus. In this way, the fan wheel 19 inducts air axially from the first tool guard part 11 and pumps the air into the fan housing 18 from which it is guided away via a closed discharge elbow 25. Dust which occurs during a cutting operation is, in part, taken along by the cutting disc 2 into the first tool guard part 11 and is there vacuum removed via the fan wheel 19 with the air flow and is conducted to a collecting device (not shown) via the elbow 25.

In the embodiment shown, a pivotable second tool guard part 12 is held on the first tool guard part 11 fixedly mounted to the apparatus. The second tool guard part 12 lengthens the first tool guard part 11 in the peripheral direction in dependence upon the work position. The pivotable second tool guard part 12 coacts with a switchover device 26 which is actuated via an out-lying positioning lever 27. By means of the switchover device, the pivotable second tool guard part 12 is brought into one of the work positions. In FIG. 1, the pivotable second tool guard part 12 is switched over into the work position at the right end (in peripheral direction) of the fixedly mounted first tool guard part 11.

The pivotable tool guard part 12 is shown in the right work position and is moved with force by a spring of the switchover device 26 in the pivot direction 28 out of the first tool guard part 11 fixedly mounted to the housing. For this reason, the pivotable tool guard part 12 lies on the surface of the workpiece 29 to be cut. In this way, an excellent removal of dust is ensured.

Each of the tool guard parts (11, 12) comprises side walls (30, 32) lying next to the cutting disc 2. The side walls (30, 32) are connected to each other via a center web 31 which covers the cutting disc 2 and is curved in the peripheral direction of the cutting disc.

In order to obtain an excellent sliding of the pivotable tool guard part 12 on the surface of the workpiece 29 during a cutting movement in the direction of the double arrow 33, a slide piece 40 is mounted on the end edge 34 of the center web 31. The end edge 34 faces away from the fixedly-mounted tool guard part 11. The end edge 34 faces toward the workpiece 29 and is thereby supported on the workpiece 29 by the slide piece 40 whereby a direct contact of the tool guard part 12 on the workpiece 29 is avoided. The slide piece 40 projects beyond the end edge 34 of the center web 31 facing away from the first tool guard part 11. Preferably, the slide piece 40 projects beyond the end edge 34 with an end projection 41 as shown in FIG. 3. The arcuate slide surface 35 extends beyond the end projection 41, that is, beyond the end edge 34.

The slide piece 40 has approximately the shape of a quarter cylinder having an angle 36 of approximately 100°. The surface of the cylindrical portion defines the arcuate slide surface 35. The base body has a width B which corresponds approximately to the width S of the center web 31. The contact surface 37 of the slide piece 40 faces toward the center web 31 and is adapted to the radius of curvature of the center web 31 so that the contact surface 37 lies on the center web 31 with a precise fit and without play. The slide piece 40 is fixedly mounted to the center web 31 via screws. The screws extend through two screw bores 38 running radially to the center web 31. The fastener bores 38 terminate in a recess 39 of enlarged diameter for accommodating the respective heads of the attachment screws.

A blast channel 44 is formed in the slide piece 40. The blast channel 44 runs approximately tangential to the support surface 37 and to the center web 31 and opens in the region of the end edge 34 in the slide surface 35. The blast channel 44 also opens in the region of a ledge 41 formed on the slide piece 40. The opening 45 lies closely next to the ledge 41 so that an exiting air flow forms an air shield which effectively constitutes an extension of the center web 31 in the peripheral direction.

As shown in FIG. 4, the blast channel 44 is disposed precisely in the center referred to the width B of the slide piece 40 so that the blast channel lies precisely in the plane of the cutting disc 2 when the slide piece is centrally mounted on the end edge 34. The blast channel 44 also lies centrally with respect to the kerf cut by the cutting disc 2. The connection 46 of the blast channel 44 is defined by a transverse bore to one axial end face of the slide piece 40. As shown in FIG. 4, the blast channel 44 is centered precisely between the fastener bores 38 which lie with a spacing to the axial end face 43 as well as to the center line 42.

Air is supplied to the blast channel 44 via a hose line 47 which is diverted from the fan housing 18 via a branch-off piece 48. As shown in FIG. 2, the branch-off piece lies in the plane of the intake opening 24 at the pressure end of the fan wheel 19. This ensures that blast air is diverted which is substantially free of dust and dirt and supplied via the hose line 47 to the blast channel 44 in the slide piece 40. The dirt particles entrained in the supplied blast air do not affect the blast function. It can be advantageous to divert blast air from the housing spiral of a cooling-air blower of the drive motor.

The blast air exiting from the opening 45 enters directly into the kerf of the cutting disc 2 which is formed in the workpiece 29. The blast air is directed tangentially to the center web 31 toward the cutting disc 2 because of the position of the blast channel 44. The blast air then forms an air barrier in the kerf and lifts the dust and dirt stream which is formed from below toward the rear in the rotational direction 4 by the cutting disc. This dust and dirt stream is lifted and can be almost completely accommodated by the pivotable second tool guard part 12 and is drawn away almost completely by suction via the impeller 19.

In addition to the sliding contact of the pivotable second tool guard part 12 on the workpiece 29, a better take-up of the dirt is effected via the blast channel 44 arranged in the slide piece 40.

The tool guard 1 is made of sheet steel or sheet aluminum. The skid-like slide piece 40 preferably is made of a plastic or aluminum. The slide piece 40 is attached so that it can be easily exchanged as a part subjected to wear.

A second slide piece 40a can be mounted on the second tool guard part 12 as shown in FIG. 1. Air is then also supplied to the slide piece 40a via a second hose line 47a connected to branch-off piece 48 as shown also in FIG. 1.

The second tool guard part 12 can be pivoted from one peripheral end of the stationary first tool guard part 11 to the other peripheral end thereof utilizing a switchover device 26. The slide pieces (40, 40a) are mounted on the pivotable second tool guard part 12 as shown in FIG. 1 and are permanently connected to the pressure side of the fan wheel 19 mounted in fan housing 18.

In FIG. 1, the slide piece 40 is shown in contact engagement with the surface of workpiece 29. By actuating lever 27, the second tool guard part 12 is pivotally moved relative to the fixedly mounted first tool guard part 11 so that slide piece 40a comes into contact engagement with the surface of workpiece 29.

It is understood that the foregoing description is that of the preferred embodiments of the invention and that various changes and modifications may be made thereto without departing from the spirit and scope of the invention as defined in the appended claims.

What is claimed is:

1. A portable hand-guided work apparatus comprising:

a support;

a rotatably driven cutting tool rotatably mounted on said support and having first and second sides;

a tool guard surrounding said cutting tool over a peripheral angle;

said tool guard having a first tool guard part fixedly mounted on said support and a second tool guard part mounted so as to be pivotable relative to said first tool guard part;

each of said tool guard parts having two side walls disposed at respective sides of said cutting tool and a center web connecting said two side walls to each other;

said center web being curved and extending peripherally above said cutting tool;

the center web of said second tool guard part having an end edge facing away from said first tool guard part;

a slide piece mounted on said second tool guard part at said end edge thereof;

said slide piece having an outer rounded slide surface facing away from said end edge;

said slide piece having a blast channel formed therein; and, said blast channel having a discharge opening in said slide surface adjacent to said end edge of said center web.

2. The portable hand-guided work apparatus of claim 1, said slide piece projecting outwardly beyond said end edge in the peripheral direction of said tool guard.

3. The portable hand-guided work apparatus of claim 2, said cutting tool having a predetermined cutting width (b); and, said slide piece having a width slightly greater than said cutting width (b).

4. The portable hand-guided work apparatus of claim 3, said center web having a width (S); and, said slide piece having a width (B) corresponding approximately to said width (S) of said center web.

5. The portable hand-guided work apparatus of claim 4, said slide piece extending radially beyond said end edge of said center web.

6. The portable hand-guided work apparatus of claim 2, said second tool guard part having an overall width; and, said slide piece having a width (B) greater than said overall width.

7. The portable hand-guided work apparatus of claim 6, said slide piece having a portion overlapping said end edge and defining a slide surface extending beyond said end edge of said center web.

8. The portable hand-guided work apparatus of claim 7, said center web having a radius of curvature; said slide piece having a support surface facing toward said center web; and, said support surface being arcuate and having a radius of curvature corresponding to said radius of curvature of said center web.

9. The portable hand-guided work apparatus of claim 8, said support surface being mounted on said center web.

10. The portable hand-guided work apparatus of claim 8, said slide piece defining a partially cylindrical base body having a circular angle of approximately 100°.

11. The portable hand-guided work apparatus of claim 1, said blast channel being formed in said slide piece so as to be approximately tangential to said center web.

12. The portable hand-guided work apparatus of claim 1, said blast channel having a connection facing toward one of said side walls of said second tool guard part.

13. The portable hand-guided work apparatus of claim 12, further comprising a blower having a pressure end; and, means for connecting said blast channel to said pressure end of said blower.

14. The portable hand-guided work apparatus of claim 13, said blower being a vacuum fan of said tool guard for drawing up dust generated when said cutting tool cuts into a workpiece.

15. The portable hand-guided work apparatus of claim 1, further comprising said first tool guard part having first and second peripheral ends at peripherally opposite ends thereof; and, a position changing device for alternately pivotally moving said second tool guard part relative to said first tool guard part so as to cause said second tool guard part to be at one or the other of said peripheral ends of said first tool guard part.

16. The portable hand-guided work apparatus of claim 15, said slide piece being a first slide piece; said end edge of said second tool guard part being a first end edge thereof and said second tool guard part having a second end edge at the peripherally opposite end thereof; and, said work apparatus further comprising a second slide piece mounted on said second tool guard part at said second end edge thereof.

* * * * *